Patented Apr. 7, 1936

2,036,258

UNITED STATES PATENT OFFICE 2,036,258

ELECTROPOSITIVE COMPOSITION AND METHOD OF MAKING THE SAME

Arthur B. Cummins, Plainfield, N. J., assignor to Johns-Manville Corporation, New York, N. Y., a corporation of New York No Drawing. Application October 5, 1932, Serial No. 636,335

8 Claims. (Cl. 252—2)

This invention relates to an electropositive composition, particularly to one in which discrete particles of a base material are individually coated with an electropositive substance, and to a method of making the same.

The invention comprises the method of, and the product resulting from, applying an electropositive coating to the individual particles of comminuted diatomaceous earth or other conventional filter aid or pulverized substance and then fixing the coating in position, as, for example, by drying, when the coating is applied in wet condition, at a temperature below that at which the coating would be completely dehydrated and would lose its electropositive charge.

In the art of filtration, it is conventional to form a mixture of a liquid containing suspended impurities with a pulverulent or fibrous filter aid, such as comminuted diatomaceous earth, ash of rice hulls, asbestos fibers, or wood pulp, and force the mixture into a pressure filter. Diatomaceous earth is widely used as a filter aid. The filter retains the filter aid and a part of the impurities, in the form of filter cakes, and allows a clarified effluent to pass through, say, into suitable receivers.

Having observed that many colloidal impurities in aqueous liquors filtered commercially are electronegative, I have provided an electropositive filter aid which is more effective in retaining electronegative impurities than is the same type of filter aid that has not been made electropositive. Thus, I have treated comminuted diatomaceous earth filter aid in such manner as to supply an electropositive coating on the individual particles of diatomaceous earth. Since comminuted natural diatomaceous earth suspended in water has a negative charge, it will be obvious that giving a positive charge to diatomaceous earth involves a substantial change in its character.

Within the scope of the invention are comprehended also electropositive compositions other than those which are used as a filter aid. Thus, there may be made fillers of improved properties. For example, there may be made a filler, containing electropositive diatomaceous particles, that shows a minimized tendency to hard caking or packing when used in an abrasive or polishing composition, as will appear later.

Other materials than diatomaceous earth, as, for example, finely ground quartz, one of the conventional filter aids mentioned above, or other finely divided inert material, may be used as the base material to which the coating is applied.

In general, the base material selected should be one which, when given an electropositive nature, will be suitable for the purpose in mind. Since electropositive diatomaceous particles are particularly suitable as a filter aid, a non-caking filler ingredient of polishing and cleansing compositions, or in other compositions requiring very fine electropositive particles, the invention will be specifically illustrated with reference to diatomaceous earth as the base material.

The diatomaceous earth that is used as the base material to which the coating is applied is suitably a product resulting from calcining diatomaceous earth in comminuted form at approximately 1000° C., as described in U. S. Patent 1,477,394 to Thatcher, or from calcining the earth in comminuted form at about 1000° C. in the presence of a small proportion of chemical adapted to flux clay and induce sintering, as described in U. S. Patent 1,502,547 to Calvert, Dern and Alles. Comminuted natural, that is, not calcined, diatomaceous earth is not so convenient for use as a base material, possibly because of the difficulty of securing adequate impregnation by the coating materials.

In general, comminuted diatomaceous earth is treated with materials to provide an electropositive coating over the multiplicity of discrete particles of which the comminuted earth is composed. The coating may be applied by the precipitation of electropositive, water-insoluble material in situ, directly upon and over the surfaces of the particles, and then fixing the coating in position, as by removing soluble substances and drying, from a water-wet condition, at a temperature sufficiently low to maintain the electropositive character of the coating. Or, a material may be otherwise applied to the surfaces of the individual particles and hardened or fixed in situ. Thus, there may be applied a solution or dispersion of an electropositive dye, such as night blue, and the solvent or dispersing medium slowly evaporated, the mixture being stirred continuously or at intervals during the evaporation, to insure proper distribution of the non-volatile coating material over the surfaces of the individual particles of diatomaceous earth.

The products of the present invention and a method of producing them are illustrated in more detail in the following specific example.

The proportions of materials are expressed as parts by weight.

To 100 parts of comminuted calcined diatomaceous earth, made as described in the said patent to Thatcher, there is added a solution of a compound of a metal adapted to form an electropositive, water-insoluble substance, say, a solution containing 2½ parts of aluminum sulphate (weighed in the form of hydrated crystals) in 400 parts of water. The materials are stirred together thoroughly in order that the individual particles of diatomaceous earth may be thoroughly wetted by the solution. There is then added, with slow, gentle stirring, a solution adapted to precipitate an electropositive compound of the metal initially added, suitably an aqueous solution of sodium hydroxide in sufficient amount to produce a degree of alkalinity corresponding to the pH value 5.5 and to cause precipitation of aluminum hydroxide over the surfaces of the individual particles of diatomaceous earth. The resulting product is then washed with water, as on a filter, in a conventional manner, to remove water-soluble materials, including any unused excess of either chemical used or soluble by-product of the reaction. The washed product is then dried.

Drying is conducted at a moderately elevated temperature below that at which the precipitated aluminum hydroxide would be completely dehydrated and lose its electropositive charge. Thus, the drying may be effected at a temperature that is not substantially above 100° C. and, preferably, is approximately 80° C.

If there is a tendency for the material to become slightly bonded or caked during the drying operation, the dried product may be submitted to a mild dispersing action, as by being gently milled or by being rubbed through a screen.

A product so made, when used as a filter aid for a turbid liquid, reduces the magnitude of the charge on the electronegative particles which ordinarily constitute the turbidity of an aqueous liquid. This is illustrated by the results of comparable filtrations of aqueous raw sugar solutions with a diatomaceous earth filter aid that, in one case, had been given an electropositive coating of aluminum hydroxide and, in the other, had not been provided with a coating. There was made a mixture of the filter aid with the sugar solution, the mixture submitted to pressure filtration, and the filtrate was examined ultramicroscopically for colloid content. Using standard means, it was estimated that a given fraction of the filtrate, obtained in the test with the uncoated filter aid, contained $13.3 \times 10^{10}$ colloidal particles per c. c., whereas the corresponding fraction of the filtrate obtained with the coated diatomaceous earth filter aid contained only $7.7 \times 10^{10}$ particles per c. c.

The proportion of aluminum precipitate used may be varied within rather wide limits. Thus, there have been used proportions corresponding to 5 to 25 parts by weight of crystals of hydrated aluminum sulphate to 100 parts of diatomaceous earth. It is significant, however, that once aluminum hydroxide is formed in sufficient quantity to coat thinly and continuously the surfaces of the particles of diatomaceous earth, the use of additional amounts of the hydroxide do not give a corresponding increase in the effectiveness of the coated particles in removing colloidal impurities from solutions. In fact, the coating of excessive amounts of aluminum hydroxide upon the base material results in a retardation or slowing down of the rate of filtration of liquids with the coated material. A satisfactory proportion of aluminum hydroxide coating is 1 to 3, say about 1.7, parts of aluminum hydroxide to 100 parts of base material. Comminuted diatomaceous earth coated with aluminum hydroxide has outstanding merit, as compared to other embodiments of the invention.

The pH value at precipitation affects the quality of coating and for best results for all purposes should be maintained at approximately 5.5, say from 4.5 to 6.5.

Other alkalies than sodium hydroxide may be used. Thus, there may be used potassium or ammonium hydroxide.

Likewise, there may be used soluble compounds or salts of other metals than aluminum, with which the alkali is reacted to produce the coating material. The compound should contain a metal that may be caused to form a water-insoluble hydroxide coating over the particles of base material and the coating should be electropositive when in contact with water, after the coating has been fixed in position, as by drying.

Metals that meet these requirements and whose soluble compounds may be used in place of the aluminum sulphate mentioned above, include the trivalent or tetravalent metals chromium, iron and thorium. It will be understood that the properties of the compounds of the various metals as poisons are to be considered in selecting the metal for certain purposes.

The products made as described have interesting properties, some of which have been already indicated. The electropositive material and the base material are not simply mixed together but are intimately associated, with the electropositive material coated over the individual particles of base.

The products have the property of flocculating electronegative suspensions. This is illustrated by the following data showing the volume of settled, flocculated material produced by adding various amounts of the electropositive, pulverulent composition of the present invention to a suspension of 0.64 g. finely ground quartz in 500 g. water.

| Effect of proportion of electropositive filter aid in flocculating a quartz suspension | |
| --- | --- |
| Amount of electropositive filter aid | Volume of settled floc |
| 0 g. | 0 cc. |
| 1 | 10 |
| 4 | 35 |
| 20 | 100 |

The electropositive products of the present invention, when settling from suspensions or mixtures, do not cake hard, that is, do not pack together in such a manner that they are difficult to redistribute throughout the mixture. Thus, there has been made a polishing composition comprising electropositively coated, diatomaceous earth filler and other conventional materials, including glycerine and a mineral oil, that shows very little hard caking of the filler as the composition is allowed to stand.

Because of the flocculating of electronegative impurities in aqueous solutions, the diatomaceous filter aid provided with an electropositive coating of aluminum hydroxide or the like is particularly effective in the filtration of liquids in which there is a high proportion of such impurities. Thus, the filter aid is effective in the filtration of glue and of turbid river water.

For example, there has been made a composition adapted to be clarified by filtration and containing 200 parts of glue chips, dispersed by warming in 1,500 parts of distilled water, and containing also 4 parts of electropositive filter aid. The mixture was then subjected to pressure filtration, at a temperature of 55° C., the pressure being increased gradually from 5 pounds up to 20 pounds per square inch. The filtrate collected in the period 15 to 30 minutes after the filtration was begun showed a turbidity or colloid content corresponding to 3.9 units. A sample of the glue filtered similarly but with filter aid that was not coated with electropositive material showed a turbidity of the corresponding fraction of 8.6 units. Furthermore, the rate of filtration was faster with coated filter aid than with the conventional, not coated filter aid. The filter aid used consisted of diatomaceous filter aid made according to the U. S. Patent 1,502,547 and coated, in one case, as described under the example, and, in the other case, not coated.

Filtering a turbid river water in comparable manner, first, with a conventional filter aid and, second, with the same filter aid electropositively coated, and observing the filtrates with a Tyndallometer, there was noted a more pronounced Tyndall effect in the filtrate from the conventional filter aid than from the electropositive aid.

It is to be understood that the coating or filter aid described as "electropositive" or having a positive charge is one that shows a positive charge when in contact with a liquid composition that is to be filtered or other liquid composition in which the coated material is to be used, as, for example, in contact with water. It is not necessary that the coated material in dry form should be electropositive.

The details that have been given are for the purpose of illustration and not restriction, and many variations may be made without departing from the spirit and scope of the invention.

What I claim is:

1. A pulverulent filter aid comprising fine particles of diatomaceous earth and incompletely dehydrated electropositive material coated thereover, the proportion of electropositive material being substantially less than the proportion of diatomaceous earth.

2. A pulverulent composition of matter comprising fine particles of diatomaceous earth and a coating thereover of an incompletely dehydrated electropositive, water-insoluble hydroxide of a trivalent metal, in the proportion of less than 3 parts by weight to 100 parts of total product.

3. A pulverulent filter aid comprising fine particles of diatomaceous earth and a thin coating thereover of electropositive aluminum hydroxide in the condition of having been incompletely dehydrated at a temperature not substantially above 100° C.

4. The method of making an electropositive filter aid comprising the precipitation in the presence of water of an electropositive inorganic gelatinous precipitate on the surface of a pulverulent filter aid and incompletely drying the thus coated filter aid at a moderately elevated temperature, to remove a large part but not all of the water present, with preservation of the electropositive character of the precipitated material.

5. In making an electropositive composition, the method which comprises treating an inert, finely divided material with an aqueous solution of a compound of a metal adapted to form an electropositive, water-insoluble precipitate, adding to the treated material a solution adapted to precipitate the said electropositive precipitate, then removing water-soluble materials, and finally drying the resulting product at a temperature not substantially above 100° C.

6. In making an electropositive filter aid or the like, the method which comprises the precipitation of a water-insoluble, electropositive hydroxide of a metal on the surface of inert, finely divided base material, removing water-soluble materials, and drying the finished product without the complete dehydration of the precipitated hydroxide, the precipitation of the said hydroxide being made at an alkalinity corresponding to a pH value of approximately 5.5.

7. In making an electropositive filter aid or the like, the method which comprises the precipitation of a water-insoluble, electropositive hydroxide of a metal on the surface of inert, finely divided base material, removing water-soluble materials, and drying the finished product without the complete dehydration of the precipitated hydroxide, the precipitation including treating the base material with a solution of a compound of the metal whose hydroxide it is desired to precipitate and then adding an alkali, to cause the precipitation.

8. In the purification of a liquid containing suspended electronegative impurities, the method which comprises intimately mixing an electropositive pulverulent filter aid with the said liquid and then filtering the resulting mixture, whereby the electronegative impurities become associated with the electropositive filter aid and are retained thereby, the said filter aid including a finely divided inert carrier and a thin electropositive coating thereover that is insoluble in the said liquid.

ARTHUR B. CUMMINS.